3,037,911
CHEWABLE, PALATABLE, VITAMIN B PREPARATIONS
Lewis E. Stoyle, Jr., Westfield, Philip A. Ouellette, Rahway, and Edward J. Hanus, Palisade, N.J., assignors to Merck & Co., Rahway, N.J., a corporation of New Jersey
No Drawing. Filed Sept. 4, 1959, Ser. No. 838,060
5 Claims. (Cl. 167—81)

This invention relates to novel pharmaceutical preparations and more particularly this invention relates to coated vitamin products which are substantially tasteless.

Certain of the vitamins are difficult to formulate into a palatable product and require special compounding techniques because of their inherently unpleasant taste. Various types of formulations have been suggested to overcome the taste problem, but, for the most part, these formulations are generally not completely satisfactory. In general the taste problem has been atacked by various techniques which are aimed at masking the taste of these vitamins by substituting for the undesirable unpalatable flavor of the vitamins an overriding or overwhelming flavor which is somewhat more agreeable to one taking the vitamins. These techniques include the use of flavoring agents in tableting or capsule-coating operations and the use of various flavored solutions and emulsions.

However, the addition of a masking flavor is not a completely satisfactory technique because the objectionable flavor of the vitamins in most instances manifests itself in the phenomenon of after-taste. Thus, masking the flavor of vitamins is only partly effective in solving the flavor problem.

It is an object of this invention to provide a preparation in which the disagreeable flavors of the various vitamins is absent. Another object of this invention is to provide vitamin preparations which are substantially tasteless. A further object of this invention is to provide various vitamin preparations which may be formulated without concern for their taste. Other objects and advantages of this invention will become apparent in the course of the following detailed description and disclosure.

It has been found that the water soluble vitamins can be rendered substantially tasteless by coating these vitamins with a fatty composition which is a solid at room temperature. The fatty composition used for coating the various vitamins should have a melting point of at least about 45° C. in order that the preparation of the coated vitamins may be accomplished with facility and in order to insure the stability of these preparations at ordinary temperatures.

The coating process involves the preparation of a suspension of the particular vitamin in a molten fatty material and the chilling of the resulting suspension to produce solid spheroidal particles of the vitamin having a coating of the fatty composition. By spheroidal particles is meant discrete rounded particles which may be of spherical or nearly spherical shape.

The vitamins, thiamine (vitamin $B_1$), riboflavin (vitamin $B_2$) and niacinamide, among the water soluble vitamins, and some of the oil soluble vitamins have tastes which are particularly objectionable. Other of the water soluble vitamins, including ascorbic acid (vitamin C) and cyanocobalamin (vitamin $B_{12}$), for example, may also be coated in accordance with this invention. The coating of oil soluble vitamins, such as vitamin A, the D vitamins, or vitamin E, on the other hand, would not be advantageously effected in accordance with this invention because of the solubility characteristics of these vitamins. Since the coatings are produced by a process of chilling a suspension of the vitamin in a fatty composition, the solubility characteristics of the vitamin would be critical in the operation of the process. In the case of the oil soluble vitamins the preparation of a true suspension of the vitamin in the fatty composition would not be satisfactorily accomplished since solution of the vitamin in the fatty composition would be likely. Thus, the types of materials to be formulated in accordance with this invention would include the water soluble vitamins and exclude the oil soluble vitamins.

The fatty compositions which may be used in providing the preparations of this invention may be generally characterized as fatty, fat-like or wax-like compositions having a melting point of at least 45° C. and not greater than a temperature at which vitamin present in the molten fatty suspension would tend to be degraded. Of course, material handling problems and equipment requirements might dictate that fatty compositions having very high melting points, even though without the range of degradation of the vitamin, would not be particularly desirable for use in the preparations of this invention.

Fatty compositions consisting entirely or predominantly of a mixture of saturated fatty acids having from 14 to 18 carbon atoms may be used in practicing the instant invention. Fatty compositions consisting entirely of mixtures of saturated fatty acids, such as, for example, stearic and palmitic, stearic and myristic, palmitic and myristic, stearic, palmitic and myristic, are quite satisfactory. Fatty compositions consisting predominantly of a mixture of saturated fatty acids and containing up to about 11% by weight unsaturated fatty acid selected from the group consisting of oleic acid, linoleic acid and mixtures thereof may be used with equal facility. Fatty compositions of the latter type are particularly useful and preferred by reason of their relative cheapness and availability. Specifically, fatty compositions commercially available from Emery Industries, Inc., Cincinnati, Ohio, under the name Emersol, such as, for example, Emersol 110, Emersol 120, Emersol 132, Emersol 140 and Emersol 150 are especially valuable. In each case it is, of course, essential that the melting point be in the above described range, that the fatty compositions be pharmaceutically and medically acceptable, and that no undesirable taste be imparted to the preparations of this invention by the fatty composition itself. With these requirements in mind any of the above mentioned fatty or waxy compositions would be suitable for use in the preparations of the instant invention.

The vitamins may be used in proportions of up to about 50 percent by weight of the mixture of vitamin and fatty composition with proportions of up to about 35 percent preferred for optimum taste effect.

The process of coating the vitamin may be accomplished in a variety of ways so long as the product obtained is the result of a chilling action upon a suspension of the vitamin in a molten fatty composition.

Various chilling techniques are known. For example, the hot suspension may be dropped into a cooled bath of water or other suitable known non-solvent for the suspension, whereby droplets of the suspension are caused to solidify. Another technique is the use of a spinning disc type of apparatus. This is operated by causing the hot suspension to impinge upon the surface of a spinning disc, which divides the suspension into small globules and scatters them into a chilling zone, which serves for chilling the suspension, such as by provision of cooling means therein. A particularly desirable and preferred means of accomplishing this result is the use of a spray chilling technique. For operation of this technique the suspension of the vitamin in the molten fatty composition is passed through heated lines to a heated nozzle and thereupon sprayed into a chilling zone or chamber which is maintained at ambient or lower temperatures, whereupon discrete coated particles of the preparation solidify upon being sprayed into this chilling zone.

The product of any of these chilling methods is a particulate mass in which the particles are individually spheroidal in shape and of a size in the range of from about 16 mesh to about 325 mesh. Preferably they are in the range of from about 40 mesh to 200 mesh. These particles are found to be homogeneous in appearance and to possess a coating of the fatty composition utilized in the preparation of the suspension.

The product is essentially tasteless and may be readily formulated into various types of tablets and other pharmaceutical forms as desired. Because of the objectionable taste of the vitamins used, exemplified by the disagreeable taste of vitamin $B_1$, vitamin $B_2$ and niacinamide, for example, the products of this invention are particularly useful in the form of chewable tablets. In addition to the coated preparations of this invention the formulated tablets may contain flavoring agents, lubricants, coloring materials and the like as desired. However, the inclusion of flavoring agent in the tablets formulated from the preparations of this invention is not at all necessary and might be dispensed with, if desired, since the tablets would be otherwise substantially tasteless.

The instant invention will be better understood by reference to the following examples which are intended for purposes of illustration only and are not intended as in any way limiting the scope of this invention, which is defined in the appended claims.

Example 1

A quantity of 750 g. of Emersol 132 stearic acid containing about 49% by weight of stearic acid, 50% palmitic acid and 1% myristic acid was melted and maintained at a temperature of 70° C. and 250 g. of riboflavin was added with stirring. The heated mixture was continuously stirred until a smooth, homogeneous suspension was obtained. The suspension was passed through heated lines to an external mixing pneumatic nozzle maintained at a temperature of 100° C. and sprayed through the heated nozzle into a chilling chamber containing circulating air at 25° C. The resulting orange powder, having a particle size of about 150 mesh, was found to be substantially tasteless.

Salts of riboflavin, such as riboflavin phosphate, may be similarly utilized.

Example 2

The procedure of Example 1 was followed except that Emersol 150 stearic acid containing about 82% by weight of stearic acid, 15% palmitic acid, 2% myristic acid and 1% oleic acid was substituted for Emersol 132 stearic acid and a feed temperature of 93° C. was used. The product was found to have a particle size of about 200 mesh and to be substantially tasteless.

Example 3

A quantity of 750 g. of Emersol 132 stearic acid was melted and maintained at a temperature of 83° C. and 250 g. of thiamine mononitrate was added with stirring. The heated mixture was continuously stirred until a smooth, homogeneous suspension was obtained. The suspension was passed through heated lines to an external mixing pneumatic nozzle maintained at a temperature of 100° C. and sprayed through the heated nozzle into a chilling chamber containing circulating air at 23° C. The resulting white powder, having a particle size of about 200 mesh, was found to be substantially tasteless.

Other salts of thiamine, such as thiamine hydrochloride, may be similarly utilized.

Example 4

The procedure of Example 3 was followed except that Emersol 150 stearic acid was substituted for Emersol 132 stearic acid. The product, having a particle size of about 200 mesh, was found to be substantially tasteless.

Example 5

The procedure of Example 3 was followed except that 16 kg. of Emersol 132 stearic acid and 8 kg. of thiamine mononitrate was used and the product was found to have a particle size of about 40 mesh.

Example 6

A quantity of 12 kg. of Emersol 132 stearic acid was melted and maintained at a temperature of 75° C. and 6 kg. of niacinamide was added with stirring. The mixture was continuously stirred until a smooth, homogeneous suspension was obtained. The suspension was passed through heated lines to an external mixing pneumatic nozzle maintained at a temperature of 100° C. and sprayed through the heated nozzle into a chilling chamber containing circulating air at a temperature of 25° C. The resulting white powder, having a particle size of about 40 mesh, was found to be substantially tasteless.

Nicotinic acid may be similarly utilized.

Example 7

A 500 g. quantity of Emersol 150 stearic acid was melted by heating to a temperature of 95° C. To the resulting heated melt was added 0.6 g. of vitamin $B_{12}$ with constant stirring. The mixture was stirred until a smooth homogeneous suspension was obtained. The suspension was passed through heated lines to a spinning disc maintained at a temperature of 100° C. and atomized into a chilling chamber containing circulating air at 23° C. The pink powder had a particle size of about 325 mesh.

Various analogs of vitamin $B_{12}$ having vitamin $B_{12}$ activity may be similarly utilized.

Example 8

A 500 g. quantity of Emersol 132 stearic acid was melted by heating to a temperature of 70° C. To the resulting heated melt was added 0.6 g. of vitamin $B_{12}$ with constant stirring. The mixture was stirred until a smooth, homogeneous suspension was obtained. The suspension was passed through heated lines to a spinning disc maintained at 100° C. and atomized into a chilling chamber containing circulating air at 23° C. The resulting pink powder had a particle size of about 200 mesh.

Example 9

A 500 g. quantity of Emersol 140 stearic acid containing about 27% by weight of stearic acid, 70% palmitic acid, 1% myristic acid and 2% oleic acid was melted by heating to a temperature of 65° C. To the resulting heated melt was added 0.6 g. of vitamin $B_{12}$ with constant stirring. The mixture was stirred until a smooth, homogeneous suspension was obtained. The suspension was passed through heated lines to a spinning disc maintained at a temperature of 100° C. and atomized into a chilling chamber, containing circulating air at 23° C. The resulting pink powder had a particle size of about 200 mesh.

Example 10

The procedure of Example 3 was followed except that Emersol 110 stearic acid containing about 39% by weight stearic acid, 48% palmitic acid, 2% myristic acid, 10% oleic acid and 1% linoleic acid was substituted for Emersol 132 stearic acid. The product was found to be substantially tasteless.

Example 11

The procedure of Example 1 was followed except that Emersol 120 stearic acid containing about 41% by weight stearic acid, 51% palmitic acid, 2% myristic acid and 6% oleic acid was substituted for Emersol 132 stearic acid. The product was found to be substantially tasteless.

Example 12

A quantity of 750 g. of a fatty composition containing about equal parts by weight of stearic and palmitic acid was melted and maintained at a temperature of 70° C. and 250 g. of riboflavin was added with stirring. The heated mixture was continuously stirred until a smooth, homogeneous suspension was obtained. The suspension was passed through heated lines to an external mixing pneumatic nozzle maintained at a temperature of 100° C. and sprayed through the heated nozzle into a chilling chamber containing circulating air at 25° C. The resulting product was found to be substantially tasteless.

The products of this invention may be readily formulated in various ways by the use of conventional formulating techniques. For example, tablets may be prepared by mixing about 1.1 parts of the tasteless vitamins of this invention with about 97.9 parts of powdered sucrose and about 1.0 part of magnesium stearate, and compressing the mixture into suitably formed tablets which are easily handled and readily chewable. The products of this invention may also be utilized in the formulation of chewable multivitamin tablets by using mixtures of the tasteless vitamins and other nutritional ingredients.

Various changes and modifications of the invention can be made, and to the extent that such variations incorporate the spirit of the instant invention, they are intended to be included within the scope of the appended claims.

This application is a continuation-in-part of our co-pending application, Serial Number 777,179 filed December 1, 1958, now abandoned.

What is claimed is:

1. A chewable preparation consisting essentially of an unpleasant tasting, water-soluble vitamin selected from the group consisting of vitamins of the B family, niacinamide and water-soluble derivatives thereof and, as a coating for particles thereof, a pharmaceutically and medically acceptable fatty composition having a melting point of at least 45° C. and consisting essentially of a mixture of saturated fatty acids having from 14 to 18 carbon atoms, said preparation being palatable with respect to said vitamin when chewed.

2. The preparation of claim 1 wherein the fatty composition is essentially a mixture of stearic acid and palmitic acid.

3. A chewable preparation consisting essentially of an unpleasant tasting, water-soluble vitamin selected from the group consisting of vitamins of the B family, niacinamide and water-soluble derivatives thereof and, as a coating for particles thereof, a pharmaceutically and medically acceptable fatty composition having a melting point of at least 45° C. and consisting essentially of a mixture of saturated fatty acids having from 14 to 18 carbon atoms and up to about 11% by weight of an unsaturated fatty acid selected from the group consisting of oleic acid, linoleic acid and mixtures thereof, said preparation being palatable with respect to said vitamin when chewed.

4. A chewable tablet preparation containing a water-soluble vitamin selected from the group consisting of vitamins of the B family, niacinamide and water-soluble derivatives thereof, said vitamin normally rendering said preparation distasteful when chewed and, as a coating for particles thereof, a pharmaceutically and medically acceptable fatty composition having a melting point of at least 45° C. and consisting essentially of a mixture of saturated fatty acids having from 14 to 18 carbon atoms, said preparation containing said vitamin coated with said fatty composition being rendered palatable with respect to said vitamin when chewed.

5. A chewable tablet preparation containing a water-soluble vitamin selected from the group consisting of vitamins of the B family, niacinamide and water-soluble derivatives thereof, said vitamin normally rendering said preparation distasteful when chewed and, as a coating for particles thereof, a pharmaceutically and medically acceptable fatty composition having a melting point of at least 45° C. and consisting essentially of a mixture of saturated fatty acids having from 14 to 18 carbon atoms and up to about 11% by weight of an unsaturated fatty acid selected from the group consisting of oleic acid, linoleic acid and mixtures thereof, said preparation containing said vitamin coated with said fatty composition being rendered palatable with respect to said vitamin when chewed.

References Cited in the file of this patent

UNITED STATES PATENTS

| | | |
|---|---|---|
| 2,685,517 | Dunmire | Aug. 3, 1954 |
| 2,816,854 | Gross | Dec. 17, 1957 |
| 2,877,159 | Lachman | Mar. 10, 1959 |

FOREIGN PATENTS

| | | |
|---|---|---|
| 285,091 | Great Britain | June 10, 1929 |

OTHER REFERENCES

The Merck Index, 6th ed., published by Merck & Co., Inc., Rahway, N.J., page 903 (April 1952).